United States Patent [19]

Roe et al.

[11] Patent Number: 4,662,771
[45] Date of Patent: May 5, 1987

[54] QUICK RELEASE LOCK MECHANISM FOR TELESCOPING MEMBERS

[75] Inventors: Elverton O. Roe; Charles G. Moore, both of Wooster, Ohio

[73] Assignee: The Wooster Brush Company, Wooster, Ohio

[21] Appl. No.: 853,981

[22] Filed: Apr. 21, 1986

[51] Int. Cl.$^4$ .......................... F16B 7/10; F16D 1/12
[52] U.S. Cl. ................................ 403/108; 403/317; 403/322
[58] Field of Search ............... 403/108, 316, 317, 322, 403/107, 109; 285/303

[56] References Cited

U.S. PATENT DOCUMENTS

| 1,371,882 | 3/1921 | Ferguson et al. | |
| 2,382,291 | 8/1945 | Carlberg | 403/107 |
| 2,470,256 | 5/1949 | McIlroy | |
| 3,190,168 | 6/1965 | Sullivan | |
| 3,317,220 | 5/1967 | Bruning | |
| 3,351,359 | 11/1967 | Ferraris | 285/303 X |
| 4,198,080 | 4/1980 | Carpenter | |
| 4,365,535 | 12/1982 | Buttner et al. | |
| 4,480,497 | 11/1984 | Locher | 403/108 X |

Primary Examiner—Andrew V. Kundrat
Attorney, Agent, or Firm—Renner, Otto, Boisselle & Lyon

[57] ABSTRACT

Lock mechanism includes a first sleeve on the inner end of the outer telescoping member having a forward extension with a non-circular central passage therethrough for close sliding receipt of a non-circular external surface on the inner tubular member to prevent relative rotation between the telescoping members. The forward extension has an external circumferential groove, and a radial opening extending through the bottom of the groove for receipt of a ball that successively engages a plurality of longitudinally spaced sockets in one of the non-circular sides of the inner telescoping member during relative longitudinal movement therebetween. Surrounding the first sleeve is a second sleeve having an internal shoulder which when in radial alignment with the ball prevents the ball from disengaging a selected socket in the inner telescoping member to positively lock the telescoping members against relative longitudinal movement, and an internal recess which when in radial alignment with the ball permits radial movement of the ball into and out of the sockets so that the inner telescoping member may be moved longitudinally in or out relative to the outer telescoping member.

24 Claims, 5 Drawing Figures

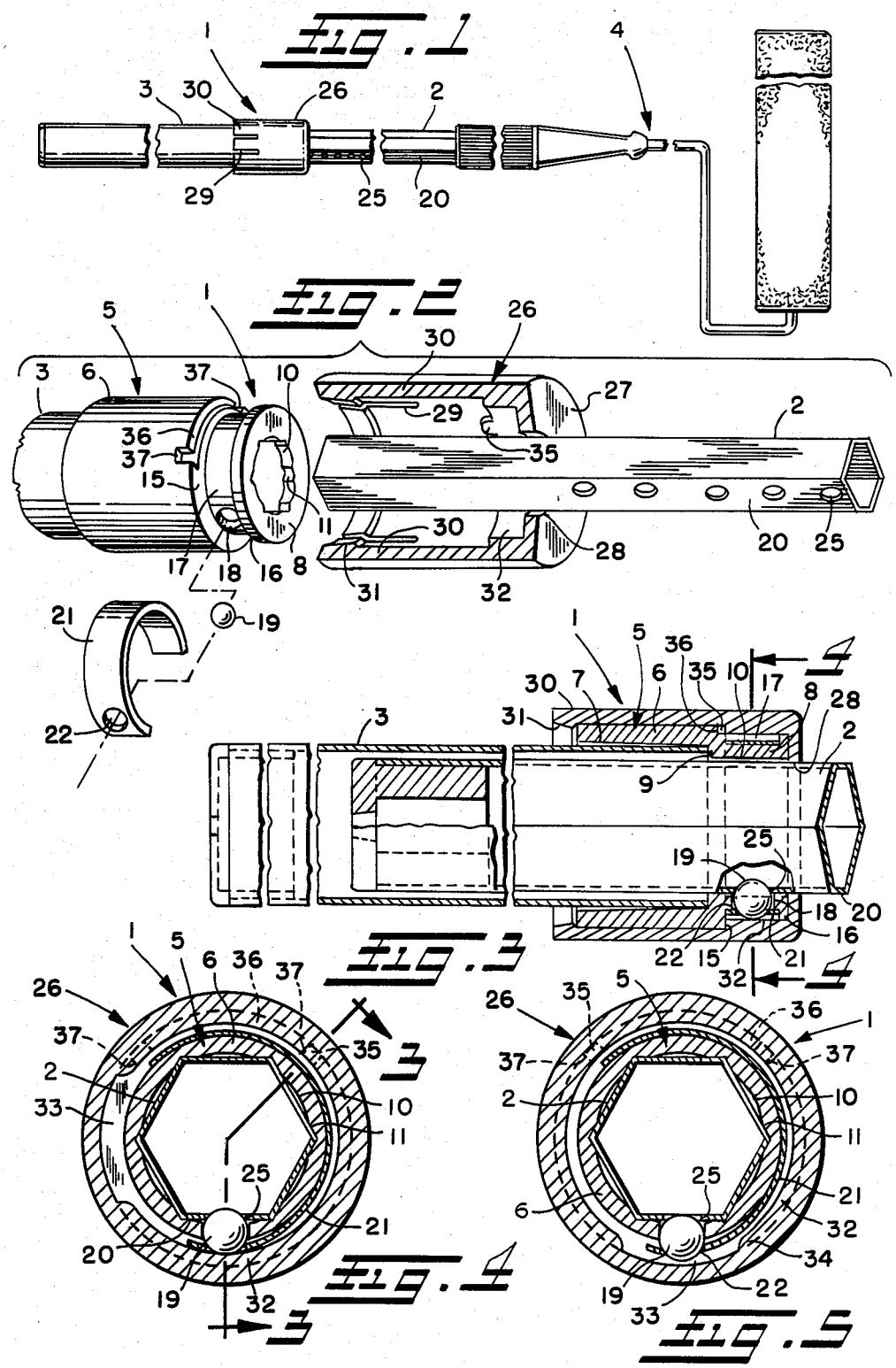

4,662,771

QUICK RELEASE LOCK MECHANISM FOR TELESCOPING MEMBERS

BACKGROUND OF THE INVENTION

This invention relates generally as indicated to a quick release lock mechanism for positively locking a pair of telescoping members in any one of a plurality of discrete longitudinally spaced positions while at all times keeping such telescoping members from rotating relative to each other.

Telescoping members of the type disclosed herein are primarily intended to be used as handle extensions for such devices as paint rollers and the like for painting ceilings and other difficult to reach surfaces without the need for a ladder. Two different known types of lock mechanisms for releasably locking such telescoping members in longitudinal adjusted positions are shown in U.S. Pat. Nos. 3,596,946 and 3,603,623 assigned to the same assignee as the present application.

Although such prior lock mechanisms have performed satisfactorily in the past, there is still a need for a simplified lock mechanism that is easy to operate and provides for the quick and facile movement of the telescoping members to any one of a plurality of discrete positions at while the telescoping members may be positively locked against further movement. Also, there is a need for such a lock mechanism that positively restrains such telescoping members against relative rotation both while such adjustments are being made and after the telescoping members have been moved to the desired longitudinal adjusted position.

SUMMARY OF THE INVENTION

With the foregoing in mind, it is a principal object of this invention to provide a lock mechanism for telescoping members which provides for ease of adjustment of the overall length of the telescoping members to any one of a plurality of discrete longitudinally spaced positions and the positive locking of such members in any one of such discrete positions.

Another object is to provide such a lock mechanism which at all time precludes relative rotation between such telescoping members.

Still another object is to provide such a lock mechanism which is of a relatively simple and inexpensive construction, is easy to operate, and positively locks the telescoping members in any one of a plurality of discrete longitudinally spaced positions.

These and other objects of the present invention may be achieved utilizing a lock mechanism including a first sleeve member on the inner end of the outer telescoping member having a forward extension thereon with a non-circular longitudinal opening therethrough for close sliding receipt of a non-circular external surface on the inner telescoping member to prevent relative rotation between the telescoping members. The forward extension has an external circumferential groove therein, with an opening through the bottom wall of the groove for receipt of a ball that is urged into engagement with one of the non-circular sides of the inner telescoping member. Along the length of such one side are a plurality of axially spaced sockets which are successively engaged and disengaged by the ball during relative longitudinal movement between the telescoping members.

Surrounding the first sleeve member is a second sleeve member having an internal shoulder thereon which when rotated into radial alignment with the ball prevents the ball from disengaging a selected socket in the inner telescoping member thus to positively retain the telescoping members against relative longitudinal movement. Circumferentially spaced from the internal shoulder is a relieved area which when rotated into radial alignment with the ball permits radial movement of the ball into and out of the sockets in the inner telescoping members so that the inner telescoping member may be moved longitudinally in or out relative to the outer telescoping member.

Limited rotational movement of the second sleeve member relative to the first sleeve member between the ball engaging and disengaging positions may be achieved by providing an axial projection on the outer sleeve member which extends into an arcuate slot in the inner sleeve member. Detents may also be provided at the ends of the slot which when engaged by the projection will releasably latch the outer sleeve member in one or the other of the ball engaging and disengaging positions. Also, resilient gripping fingers may be provided on the rear end of the outer sleeve member for retaining the outer sleeve member on the inner sleeve member, such fingers acting as springs urging the axial projection on the outer sleeve member into the respective detents at the ends of the arcuate slot in the inner sleeve member.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

In the annexed drawing:

FIG. 1 is a fragmentary top plan view of a pair of telescoping members shown being used as a handle extension for a conventional paint roller, such telescoping members having associated therewith a preferred form of lock mechanism in accordance with this invention for use in locking such telescoping members in any one of a plurality of discrete longitudinally spaced positions;

FIG. 2 is an enlarged, exploded, perspective view, partly in section, showing the various parts of the lock mechanism of FIG. 1 in disassembled condition;

FIG. 3 is an enlarged fragmentary longitudinal section through the lock mechanism of FIG. 1, generally taken along the plane of the line 3—3 of FIG. 4, such lock mechanism being shown in the locked condition preventing relative longitudinal movement between the telescoping members;

FIG. 4 is an enlarged transverse section through the lock mechanism of FIG. 3 taken generally along the plane of the line 4—4 thereof; and FIG. 5 is an enlarged transverse section through the lock mechanism similar to FIG. 4, but showing the lock mechanism in the unlocked condition permitting relative longitudinal movement of the telescoping members to any one of a plurality of discrete longitudinally spaced positions.

DESCRIPTION OF THE PREFERRED EMBODIMENT

Referring now in detail to the drawing and initially to FIG. 1, there is shown a pair of inner and outer telescoping members 2, 3 releasably connected together by a preferred form of lock mechanism 1 in accordance with this invention for positively locking the telescoping members in any one of a plurality of discrete longitudinally spaced positions. The telescoping members 2, 3 are illustrated being used as a handle extension for a paint roller 4, but it will be apparent that such telescoping members may be used for other purposes as well.

The outer telescoping member 3 is generally tubular in cross-section, and has an inner diameter sufficiently greater than the outer diameter of the inner telescoping member 2 for telescoping receipt of the inner member within the outer member. The inner member may either be of a solid or tubular section, but a tubular section is preferred for reduced weight. Also, both telescoping members are desirably made of a lightweight material such as aluminum which has the necessary strength to support the paint roller 4 or other device during use.

As best seen in FIGS. 2 and 3, the lock mechanism 1 includes a first sleeve member 5 having a main body portion 6 with a counterbore 7 therein opening to the rear for insertion over the inner end of the outer telescoping member 3 and a reduced diameter extension 8 on the forward end thereof forming an internal shoulder 9 at the forward end of the counterbore against which the inner end of the outer telescoping member is seated. The first sleeve member may be permanently secured to the outer telescoping member in any suitable manner, for example, by indenting or peening the first sleeve member into locking engagement with the outer telescoping member, or by using a suitable bonding agent or the like. The forward extension 8 has a longitudinal opening 10 therethrough which preferably includes multiple flat sides 11 (see FIGS. 4 and 5) for close sliding receipt of a non-circular external surface of the inner telescoping member 2. This prevents relative rotation between the telescoping members 2, 3 for all longitudinal adjusted positions of the telescoping members without having to make the outer telescoping member 2 and particularly the inner diameter thereof conform to the non-circular external shape of the inner telescoping member 2. In the preferred embodiment disclosed herein, the outer telescoping member 3 is circular in cross-section.

The forward extension 8 of the first sleeve member 5 is generally cylindrical and has an outer diameter that is somewhat less than that of the main body portion 6 to provide therebetween a forwardly facing external shoulder 15. Shoulder 15 in turn cooperates with an outturned flange 16 at the forwardmost end of the sleeve extension 8 to form a circumferential groove 17 in the exterior of the sleeve extension. Extending through the bottom wall of the groove 17 is a radial opening 18 for receipt of a ball 19. Preferably ball 19 is urged into engagement with one of the noncircular sides 20 of the inner telescoping member 2 as by means of an elongated leaf spring 21 wrapped around the bottom wall of the groove and retained therewithin by the external shoulder 15 and outturned flange 16. One end of the leaf spring 21 may have a hole or a socket 22 therein of a diameter somewhat less than the diameter of the ball to provide a seat for the ball thus maintaining the parts in the desired assembled relation.

Longitudinally spaced along the length of such one side 20 of the inner telescoping member 2 are a plurality of sockets 25 formed as by providing holes through such one side of a diameter less than the diameter of the ball 19. The radial opening 18 in the first sleeve 5 is in longitudinal alignment with the sockets 25, whereby the sockets are successively engaged by the ball 19 during longitudinal sliding movement of the inner telescoping member 2 into and out of the outer telescoping member 3, the force of the spring 21 being sufficient to hold the ball against the inner telescoping member 2 but being insufficient to prevent the ball from being forced out of the sockets during such relative longitudinal movement.

When the telescoping members 2, 3 are moved to the desired longitudinal adjusted position with the ball 19 seated in any one of the discretely spaced sockets 25 in the inner telescoping member 2, the telescoping members 2, 3 may be locked against further relative longitudinal movement by rotating a second sleeve member 26 a part turn on the first sleeve member 5.

As clearly shown in FIGS. 2 and 3, the second (outer) sleeve member 26 may be inserted over the first (inner) sleeve member 5 from the forward end thereof. At the forwardmost end of the outer sleeve member 26 is an inturned flange 27 having a longitudinal opening 28 therethrough of a diameter greater than the maximum cross-sectional dimension of the inner telescoping member 2 so that the outer sleeve member 26 is free to rotate relative to the inner telescoping member. Both sleeve members 5, 26 may be made out of a suitable plastic material for ease of manufacture. To retain the outer sleeve member 26 on the inner sleeve member 5, a plurality of longitudinal slots 29 are desirably formed in the rear end of the outer sleeve member, thus providing a plurality of resilient fingers 30, with inturned flanges 31 thereon which snap over the rear end of the inner sleeve member 5.

On the inner wall of the outer sleeve member 26 adjacent the inturned flange 27 is an internal shoulder 32 which, when in radial alignment with the ball 19 as shown in FIGS. 3 and 4, prevents the ball from disengaging from a selected socket 25 in the inner telescoping member 2 to positively retain the inner and outer telescoping members in the desired longitudinal adjusted position. Also, a suitable relieved area or recess 33 is provided on the inner wall of the outer sleeve member 26 in circumferentially spaced relation from the internal shoulder 32 which when in radial alignment with the ball 19 as shown in FIG. 5, provides sufficient clearance to permit the ball to freely move in and out of the sockets 25. A cam surface 34 at one or both ends of the internal shoulder 32 provides a smooth transition of the outer sleeve member during rotation between the ball locking and ball unlocking positions shown in FIGS. 4 and 5.

To provide for controlled movement of the outer sleeve member 26 between such ball locking and ball unlocking positions, an axial projection 35 may be provided on the internal shoulder 32 of the outer sleeve member for receipt in an arcuate slot 36 along the upper edge of back wall 15 of groove 17 in the inner sleeve member 5. The arcuate slot 36 may, for example, extend approximately 90° permitting approximately one-quarter turn of the outer sleeve member 26 relative to the inner sleeve member 5. When the axial projection 35 is at one end of the slot 36, for example, the far end as shown in FIG. 2, the internal shoulder 32 will be in radial alignment with the ball 19 thereby positively retaining the ball within one of the sockets 25 in the inner telescoping member 2 as illustrated in FIGS. 3 and 4. Conversely, when the axial projection 35 is at the other end of the slot 36, i.e., the closest end of the slot as shown in FIG. 2, the relieved area 33 on the outer sleeve member will be in radial alignment with the ball permitting movement of the ball in and out of the sockets as illustrated in FIG. 5.

The ends of the arcuate slot 36 may extend rearwardly into the main body portion 6 a short distance to provide detents 37 thereat for enagement by the axial projection 35 to releasably retain the outer sleeve 26 in the two end positions, the spring like fingers 30 on the rear end of the outer sleeve member 26 acting as springs urging the projection 35 into engagement with the detents.

From the foregoing, it will now be apparent that the lock mechanism of the present invention provides for the positive locking of a pair of telescoping members in any one of a plurality of discrete longitudinally spaced positions while positively restraining such telescoping members against relative rotation both during and after such adjustments.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting axially inwardly beyond the inner end of said outer member and surrounding said inner member, said inner member having a plurality of non-circular sides, and said forward extension having a non-circular central passage therethrough for close sliding receipt of said inner member to prevent relative rotation between said inner and outer members, one of said non-circular sides of said inner member having a plurality of longitudinally spaced sockets therein, and said forward extension having a radial opening extending therethrough in longitudinal alignment with said sockets, said opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, said second sleeve having an internal shoulder which is in radial alignment with said ball when said second sleeve is in said first position and an internal recess which is in radial alignment with said ball when said second sleeve is in said second position, and means for providing controlled movement of said second sleeve between said first and second positions including an arcuate slot in one of said sleeves and a projection on the other of said sleeves received in said slot, the engagement of said projection with the ends of said slot corresponding to said first and second positions of said second sleeve, and detents at the ends of said slot for releasably retaining said second sleeve in such end positions.

2. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting axially inwardly beyond the inner end of said outer member and surrounding said inner member, said inner member having a plurality of non-circular sides, and said forward extension having a non-circular central passage therethrough for close sliding receipt of said inner member to prevent relative rotation between said inner and outer members, one of said non-circular sides of said inner member having a plurality of longitudinally spaced sockets therein, and said forward extension having a radial opening extending therethrough in longitudinal alignment with said sockets, said opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, and spring means for biasing said ball against said one side of said inner member.

3. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting axially inwardly beyond the inner end of said outer member and surrounding said inner member, said inner member having a plurality of non-circular sides, and said forward extension having a non-circular central passage therethrough for close sliding receipt of said inner member to prevent relative rotation between said inner and outer members, one of said non-circular sides of said inner member having a plurality of longitudinally spaced sockets therein, and said forward extension having a radial opening extending therethrough in longitudinal alignment with said sockets, said opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, said forward extension having an external circumferential groove including a bottom wall through which said radial opening extends, and spring means contained in said groove for retaining said ball within said radial opening.

4. The locking device of claim 3 wherein said spring means comprises a leaf spring wrapped around said groove and overlying said ball.

5. The locking device of claim 4 further comprising a socket in said leaf spring for receipt of said ball.

6. The locking device of claim 3 further comprising means for providing controlled movement of said second sleeve between said first and second positions, including an arcuate slot in one of said sleeves and a projection on the other of said sleeves received in said slot.

7. The locking device of claim 3 wherein said second sleeve includes an internal shoulder which radially overlies said ball when said second sleeve is in said first position and an internal recess which radially overlies said ball when said second sleeve is in said second position, and said groove is formed between a longitudinally spaced rear shoulder and forward flange on said forward extension, said forward flange having an outer diameter less than the inner diameter of said internal shoulder on said second sleeve to permit said internal shoulder to clear said forward flange during assembly of said second sleeve onto said first sleeve.

8. The locking device of claim 7 wherein said rear shoulder of said groove has an outer diameter greater than the outer diameter of said forward flange, further comprising means for providing controlled movement of said second sleeve between said first and second positions including an arcuate slot formed in said rear shoulder radially outwardly of said forward flange, and a projection extending longitudinally from said internal shoulder into said arcuate slot.

9. The locking device of claim 8 further comprising detents at the ends of said slot for engagement by said projection for releasably retaining said second sleeve in said first and second positions.

10. The locking device of claim 9 further comprising spring means for biasing said projection on said second sleeve toward said arcuate slot on said first sleeve and into engagement with said detents at the ends of said slot when said second sleeve is in said first and second positions.

11. The locking device of claim 10 wherein said spring means comprises spring-like fingers on the rear end of said second sleeve which resiliently press against the rear end of said first sleeve to urge said second sleeve toward the rear of said first sleeve.

12. The locking device of claim 10 wherein said second sleeve has a radial inturned flange at the forward end thereof radially overlying said forward flange on said forward extension.

13. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting forwardly beyond the inner end of said outer member surrounding said inner member, means for preventing relative rotation between said inner and outer members, said inner member having a plurality of longitudinally spaced sockets therein in longitudinal alignment with each other, and said forward extension having a radial opening extending therethrough in longitudinal alignment with said sockets in said inner member, said radial opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, and means for providing controlled movement of said second sleeve between said first and second positions including an arcuate slot in one of said sleeves and a projection on the other of said sleeves received in said slot, and detents at the ends of said slot for releasably retaining said second sleeve in such end positions upon engagement of said projection with such detents.

14. The locking device of claim 13 wherein said second sleeve has an internal shoulder which is in radial alignment with said ball when said second sleeve is in said first position and an internal recess which is in radial alignment with said ball when said second sleeve is in said second position.

15. The locking device of claim 14 further comprising an internal cam surface at one end of said internal shoulder providing a gradual transition between said internal recess and internal shoulder for ease of rotation of said second sleeve between said first and second positions.

16. The locking device of claim 13 wherein said inner member is tubular, and said sockets in said inner member comprise holes of a diameter less than the diameter of said ball.

17. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting forwardly beyond the inner end of said outer member surrounding said inner member, means for preventing relative rotation between said inner and outer members, said inner member having a plurality of longitudinally spaced sockets therein in longitudinal alignment with each other, and said forward extension having a radial opening extending therethrough in longitudinal alignment with said sockets in said inner member, said radial opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, said second sleeve including an internal shoulder which radially overlies said ball when said second sleeve is in said first position and an internal recess which radially overlies said ball when said second sleeve is in said second position, said forward extension having an external circumferential groove including a bottom wall through which said radial opening extends, said groove being formed between a longitudinally spaced rear shoulder and forward flange on said forward extension, said rear shoulder of said groove having an outer diameter greater than the outer diameter of said forward flange, and means for providing controlled movement of said second sleeve between said first and second positions including an arcuate slot formed in said rear shoulder radially outwardly of said forward flange, and a projection extending longitudinally from said internal shoulder into said arcuate slot.

18. The locking device of claim 17 further comprising spring means for biasing said projection on said second sleeve toward said arcuate slot on said first sleeve.

19. The locking device of claim 18 wherein said spring means comprises spring-like fingers on the rear end of said second sleeve which resiliently press against the rear end of said first sleeve to urge said second sleeve toward the rear of said first sleeve.

20. The locking device of claim 18 wherein said second sleeve has a radial inturned flange at the forward end thereof radially overlying said forward flange on said forward extension.

21. The locking device of claim 17 further comprising detents at the ends of said slot for engagement by said projection for releasably retaining said second sleeve in said first and second positions.

22. The locking device of claim 21 further comprising spring means for biasing said projection on said second sleeve toward said arcuate slot on said first sleeve and into engagement with said detents at the ends of said slot when said second sleeve is in said first and second positions.

23. The locking device of claim 22 wherein said spring means comprises spring-like fingers on the rear end of said second sleeve which resiliently press against the rear end of said first sleeve to urge said second sleeve toward the rear of said first sleeve.

24. A locking device for releasably locking a pair of inner and outer telescoping members in any one of a plurality of discrete longitudinally spaced positions, said outer member being tubular for telescoping receipt of said inner member in the inner end of said outer member, said locking device comprising a first sleeve affixed to the inner end of said outer member, said first sleeve having a forward extension projecting forwardly beyond the inner end of said outer member surrounding said inner member, means for preventing relative rotation between said inner and outer members, said inner member having a plurality of longitudinally spaced sockets therein in longitudinal alignment with each other, and said forward extension having a radial opening extending therethrough in longitudinal alignment with said sockets in said inner member, said radial opening containing a ball, and a second sleeve surrounding said first sleeve, said second sleeve being rotatable relative to said first sleeve between a first position locking said ball against radial outward movement when in engagement with any one of said sockets to positively lock said inner and outer members against relative longitudinal movement, and a second position permitting radial movement of said ball into and out of said sockets thus unlocking said inner and outer members to allow relative longitudinal movement therebetween, said second sleeve including an internal shoulder which radially overlies said ball when said second sleeve is in said first position and an internal recess which radially overlies said ball when said second sleeve is in said second position, said forward extension having an external circumferential groove including a bottom wall through which said radial opening extends, and spring means contained in said groove for retaining said ball within said radial opening, said spring means comprising a leaf spring wrapped around said groove and overlying said ball, and a socket in said leaf spring for receipt of said ball, said ball extending part way through said socket for direct engagement by said internal shoulder on said second sleeve when said second sleeve is in said first position.

* * * * *